US011732592B2

(12) United States Patent
Johnson (10) Patent No.: US 11,732,592 B2
(45) Date of Patent: Aug. 22, 2023

(54) METHOD OF COOLING A TURBINE BLADE (71) Applicant: General Electric Company, Schenectady, NY (US)

(72) Inventor: Steven Douglas Johnson, Milford, OH (US)

(73) Assignee: General Electric Company, Schenectady, NY (US)

( * ) Notice: Subject to any disclaimer, the term of this patent is extended or adjusted under 35 U.S.C. 154(b) by 74 days.

(21) Appl. No.: 17/409,106

(22) Filed: Aug. 23, 2021

(65) Prior Publication Data

US 2023/0059027 A1    Feb. 23, 2023

(51) Int. Cl.
F01D 5/18 (2006.01)
F01D 5/08 (2006.01)

(52) U.S. Cl.
CPC ............ F01D 5/187 (2013.01); F01D 5/081 (2013.01); F05D 2240/304 (2013.01); F05D 2260/213 (2013.01); F05D 2260/232 (2013.01); F05D 2260/601 (2013.01)

(58) Field of Classification Search
CPC .......... F01D 5/187; F01D 5/186; F01D 5/081; F01D 5/082; F01D 5/085; F01D 5/087; F05D 2260/601; F05D 2260/213
See application file for complete search history.

(56) References Cited

U.S. PATENT DOCUMENTS

| | | | |
|---|---|---|---|
| 2,988,325 A | 6/1961 | Dawson | |
| 4,820,116 A | 4/1989 | Hovan et al. | |
| 6,019,579 A * | 2/2000 | Fukuno | F01D 5/187 |
| | | | 415/115 |
| 6,174,134 B1 | 1/2001 | Lee et al. | |
| 6,957,949 B2 | 10/2005 | Hyde et al. | |
| 8,425,183 B2 | 4/2013 | Lee et al. | |
| 8,807,942 B2 * | 8/2014 | Tibbott | F01D 5/085 |
| | | | 416/193 A |
| 9,206,697 B2 | 12/2015 | Tibbott et al. | |
| 10,107,109 B2 * | 10/2018 | McCaffrey | F01D 5/187 |
| 10,519,782 B2 | 12/2019 | Clum et al. | |
| 10,544,702 B2 | 1/2020 | Johnson et al. | |
| 2002/0076318 A1 * | 6/2002 | Patel | F01D 5/081 |
| | | | 415/115 |
| 2012/0082568 A1 * | 4/2012 | Tibbott | F01D 5/088 |
| | | | 416/97 R |
| 2015/0285147 A1 * | 10/2015 | Phillips | F01D 9/06 |
| | | | 60/726 |
| 2017/0167271 A1 * | 6/2017 | McCaffrey | F01D 25/24 |

* cited by examiner

*Primary Examiner* — Eldon T Brockman
(74) *Attorney, Agent, or Firm* — Dority & Manning, P.A.

(57) ABSTRACT

A gas turbine engine defining an axial direction and a radial direction, and including a primary cooling circuit configured to receive a first flow of air; and a turbine rotor comprising a rotor blade, the rotor blade defining at least in part a forward wheelspace that is located forward of the rotor blade, the forward wheelspace configured to receive a second flow of air, the rotor blade further defining: a first cooling circuit internal to the rotor blade and in fluid communication with the primary cooling circuit for receiving the first flow of air from the primary cooling circuit; a second cooling circuit internal to the rotor blade and in fluid communication with the forward wheelspace for receiving a portion of the second flow of air from the forward wheelspace; and a means for drawing a portion of the second flow of air into the second cooling circuit.

19 Claims, 5 Drawing Sheets

METHOD OF COOLING A TURBINE BLADE

FIELD

The present disclosure relates to a gas turbine engine. In particular, the present disclosure relates to method of cooling a blade in a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

The turbomachine may include a turbine having a plurality of turbine rotor blades. The turbine rotor blades may be exposed to relatively hot temperatures during operation. In order to maintain the turbine rotor blades within an operational temperature range, it may be desirable to provide a flow of cooling air to one or more internal cavities defined within the turbine rotor blades. Improvements to such a process would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain exemplary embodiments, the combustion section may include an annular combustor, a can combustor, a cannular combustor, a trapped vortex combustor (TVC), or other appropriate combustion system, or combinations thereof.

The present disclosure is related to cooling assemblies for rotor blades used in gas turbine engines. In certain engine designs, cooling air flow supplied to a turbine blade may come from a single dedicated delivery circuit. Such configurations can omit cool air flows from other sources that end up getting dumped as purge flow or that do not otherwise perform useful motive work or thermal management in the engine.

Aspects of the present disclosure present taking air from a forward wheelspace and mixing that air with fresh cooling air being delivered to, e.g., a trailing edge circuit. For example, forward wheelspace cavity air is drawn into a shank of the turbine rotor blade and is fed to the trailing edge cooling circuit of the turbine blade where the forward wheelspace cavity air is mixed with the fresh cooling air. This mixed air is then delivered to the trailing edge cooling circuit. In using excess air from the forward wheelspace cavity to cool the trailing edge, an amount of purge flow required for cooling may be reduced potentially resulting in an improvement in the specific fuel consumption of the engine.

Figure 1:
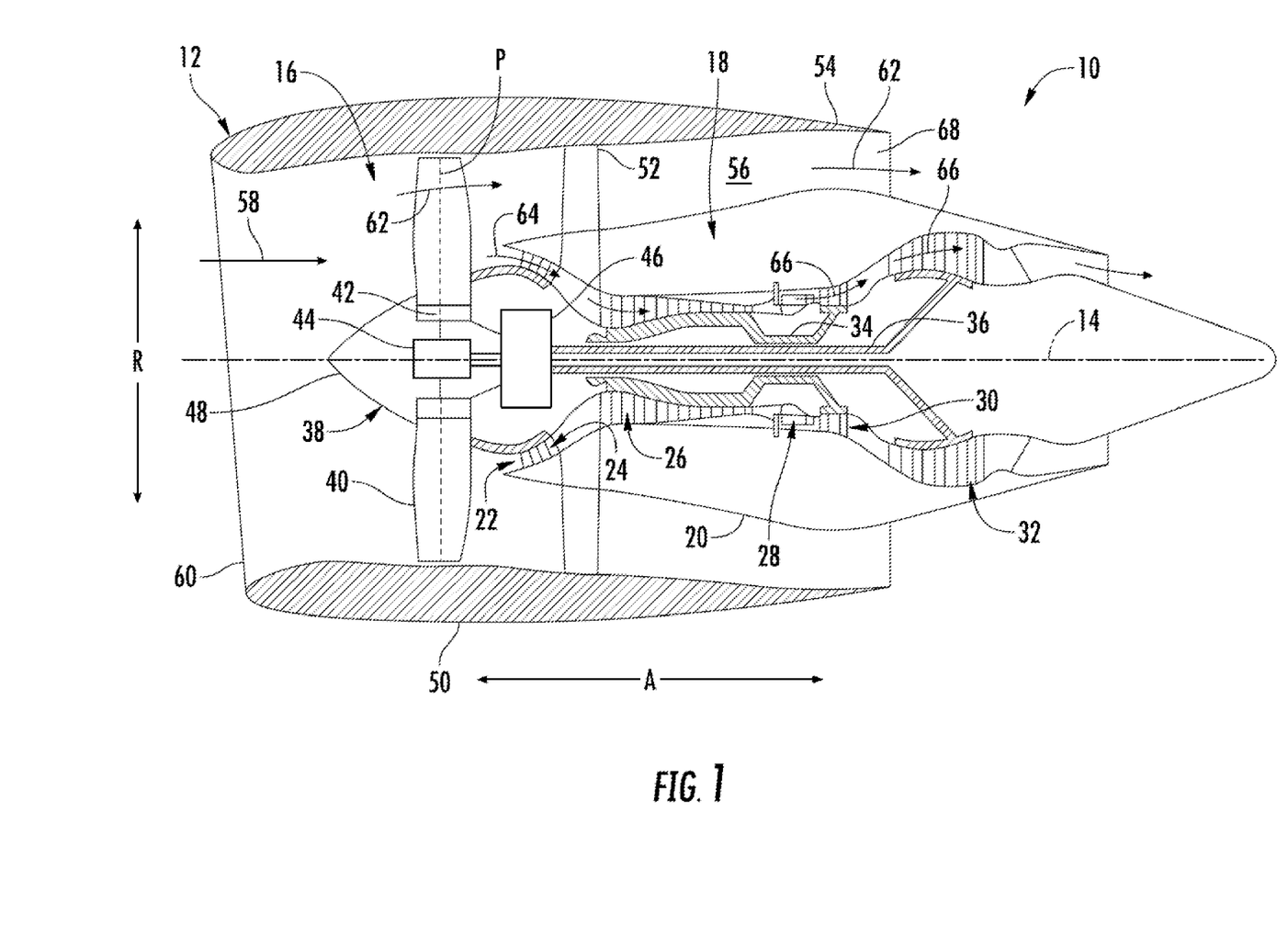
FIG. 1 is a cross-section view of a gas turbine engine in accordance with an exemplary aspect of the present disclosure.

Referring now to the drawings, wherein identical numerals indicate the same elements throughout the figures, FIG. 1 is a schematic, cross-sectional view of a propulsion system 10 in accordance with an exemplary embodiment of the present disclosure. More particularly, for the embodiment of FIG. 1, propulsion system 10 includes a gas turbine engine, referred to herein as "turbofan engine 12." In one example, turbofan engine 12 can be a high-bypass turbofan jet engine. As shown in FIG. 1, turbofan engine 12 defines an axial direction A (extending parallel to longitudinal centerline 14 provided for reference) and a radial direction R. In general, turbofan engine 12 includes a fan section 16 and a turbomachine 18 disposed downstream from fan section 16.

The exemplary turbomachine 18 depicted generally includes a substantially tubular outer casing 20 that defines an annular inlet 22. Outer casing 20 encases, in serial flow order/relationship, a compressor section including a booster or low pressure compressor 24 ("LP compressor 24") and a high pressure compressor 26 ("HP compressor 26"); a combustion section 28; a turbine section including a high pressure turbine 30 (HP turbine 30") and a low pressure turbine 32 ("LP turbine 32"); and a combustion section 28. A high pressure shaft or spool 34 ("HP spool 34") drivingly connects HP turbine 30 to HP compressor 26. A low pressure shaft or spool 36 ("LP spool 36") drivingly connects LP turbine 32 to LP compressor 24.

For the embodiment depicted, fan section 16 includes a variable pitch fan 38 having a plurality of fan blades 40 coupled to a disk 42 in a spaced apart manner. As depicted, fan blades 40 extend outwardly from disk 42 generally along radial direction R. Each fan blade 40 is rotatable relative to disk 42 about a pitch axis P by virtue of fan blades 40 being operatively coupled to a suitable actuation member 44 configured to collectively vary the pitch of fan blades 40, e.g., in unison. Fan blades 40, disk 42, and actuation member 44 are together rotatable about longitudinal centerline 14 by LP spool 36 across a power gear box 46. Power gear box 46 includes a plurality of gears for stepping down the rotational speed of LP spool 36 to a more efficient rotational fan speed.

Referring still to the exemplary embodiment of FIG. 1, disk 42 is covered by a rotatable front hub 48 aerodynamically contoured to promote an air flow through the plurality of fan blades 40. Additionally, fan section 16 includes an annular fan casing or outer nacelle 50 that circumferentially surrounds variable pitch fan 38 and/or at least a portion of turbomachine 18. It should be appreciated that in some embodiments, nacelle 50 is configured to be supported relative to turbomachine 18 by a plurality of circumferentially spaced outlet guide vanes 52. Moreover, a downstream section 54 of nacelle 50 extends over an outer portion of turbomachine 18 so as to define a bypass air flow passage 56 therebetween.

During operation of turbofan engine 12, a volume of air 58 enters turbofan engine 12 through an associated inlet 60 of nacelle 50 and/or fan section 16. As the volume of air 58 passes across fan blades 40, a first portion of air 58 as indicated by arrows 62 is directed or routed into bypass air flow passage 56 and a second portion of air 58 as indicated by arrow 64 is directed or routed into LP compressor 24. The ratio between first portion of air 62 and second portion of air 64 is commonly known as a bypass ratio. The pressure of second portion of air 64 is then increased as it is routed through high pressure (HP) compressor 26 and into combustion section 28, where it is mixed with fuel and burned to provide combustion gases 66. Subsequently, combustion gases 66 are routed through HP turbine 30 and LP turbine 32, where a portion of thermal and/or kinetic energy from combustion gases 66 is extracted.

Combustion gases 66 are then routed through combustion section 28 of turbomachine 18 to provide propulsive thrust. Simultaneously, the pressure of first portion of air 62 is substantially increased as first portion of air 62 is routed through bypass air flow passage 56 before it is exhausted from fan nozzle exhaust section 68 of turbofan engine 12, also providing propulsive thrust.

It should be appreciated, however, that turbofan engine 12 depicted in FIG. 1 is by way of example only, and that in other exemplary embodiments, aspects of the present disclosure may additionally, or alternatively, be applied to any other suitable gas turbine engine. For example, in other exemplary embodiments, turbofan engine 12 may instead be any other suitable aeronautical gas turbine engine, such as a turbojet engine, turboshaft engine, turboprop engine, etc. Additionally, in still other exemplary embodiments, turbofan engine 12 may include any other suitable number and/or configuration of shafts, spools, compressors, turbines, etc.; may be configured as a direct drive engine (e.g., excluding power gear box 46); may be a fixed-pitch fan; etc.

Figure 2:
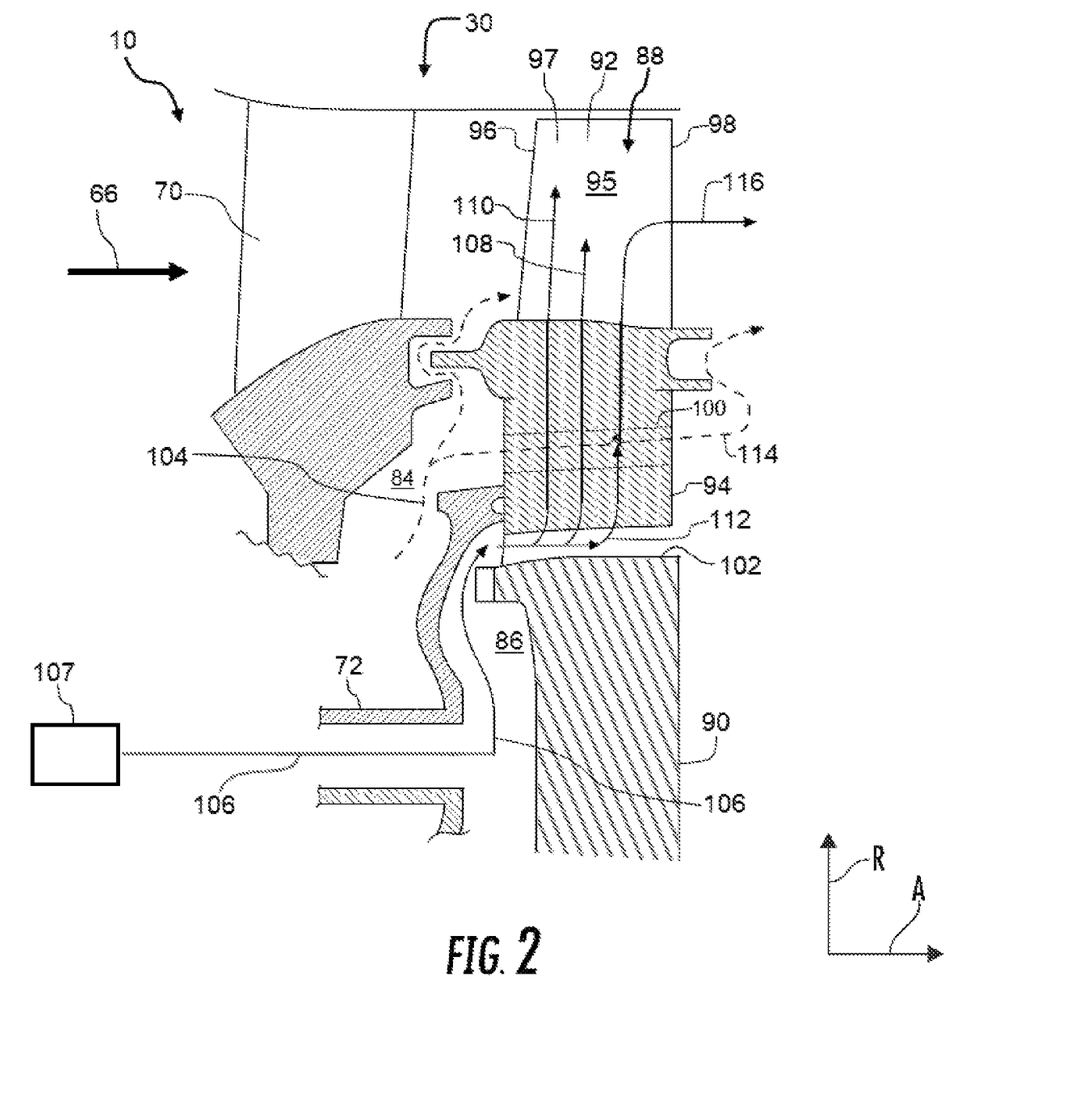
FIG. 2 is a cross section view of a portion of a gas turbine engine and shows a cooling assembly for a turbine blade in accordance with an exemplary aspect of the present disclosure.

Referring now to FIG. 2, FIG. 2 is a cross section view of a portion of propulsion system 10 and shows HP turbine 30 and a cooling assembly.

HP turbine 30 includes an inlet guide vane 70 disposed at an upstream end of HP turbine 30 (upstream direction show as to the left in FIG. 2). In this exemplary embodiment, inlet guide vane 70 is disposed downstream along axial direction A of propulsion system 10 from combustion section 28.

Propulsion system 10 also includes an inducer 72. In an exemplary embodiment, turbofan engine 12 defines inducer 72. Inducer 72 is a flow passage configured to induce a turning of an airflow therethrough in a circumferential direction (i.e., a direction extending about axial direction A). In certain exemplary embodiments, inducer 72 may include an array of circumferentially-spaced vanes. Inducer 72 is connected to and is disposed upstream from a primary cooling circuit (e.g., inducer 72 and turbine cooling cavity 86). Inducer 72 is in fluid communication with the primary cooling circuit (e.g., inducer 72 and turbine cooling cavity 86).

Propulsion system 10 further defines a forward wheelspace cavity 84. It will be appreciated, however, that in other exemplary embodiments, that forward wheelspace cavity may be referred to as a forward wheelspace. Forward wheelspace cavity 84 is located or disposed forward (e.g., to the left as shown in FIG. 2) of rotor blade 92 along axial direction A and is configured to receive the second flow of air (e.g., compressed air flow 104).

Propulsion system 10 additionally defines a turbine cooling cavity 86. Turbine cooling cavity 86 is a space or chamber. Turbine cooling cavity 86 is in fluid communication with inducer 72. In an exemplary embodiment, inducer 72 and turbine cooling cavity 86 can define (and be referred to as) as the primary cooling circuit. In certain exemplary embodiments, turbofan engine 12 includes the primary cooling circuit (e.g., inducer 72 and turbine cooling cavity 86) and turbine rotor 88. The primary cooling circuit (e.g., inducer 72 and turbine cooling cavity 86) is configured to receive the first flow of air (e.g., cooled cooling air flow 106). Additionally, the primary cooling circuit (e.g., inducer 72 and turbine cooling cavity 86) is configured to rotate about longitudinal centerline 14 of turbofan engine 12.

Propulsion system 10 further includes a turbine rotor 88. As will be appreciated, the turbine rotor 88 defines at least in part forward wheelspace cavity 84. Turbine rotor 88 is a rotary assembly configured to generate torque for propulsion system 10 in response to a flow of air passing across turbine rotor 88. Turbine rotor 88 includes a disk 90. Disk 90 is a hub configured to rotate about longitudinal centerline 14. Turbine rotor 88 also includes a rotor blade 92. Rotor blade 92 is an airfoil attached to disk 90. Rotor blade 92 is disposed to rotate about longitudinal centerline 14 along with disk 90.

Rotor blade 92 includes a shank 94 disposed at an inward portion along a radial direction of rotor blade 92, such as along the radial direction R in the embodiment depicted. Shank 94 is defined by an inward portion along radial direction R of rotor blade 92.

Rotor blade 92 also includes an airfoil portion 95 connected to and disposed outward along a radial direction from shank 94. In certain exemplary embodiments, shank 94 can be coupled to or formed integrally with airfoil portion 95. Airfoil portion 95 of rotor blade 92 defines a leading edge 96 and a trailing edge 98. Leading edge 96 defines an upstream edge of rotor blade 92 (with an upstream direction to the left as shown in FIG. 2). Leading edge 96 is disposed outward along radial direction R from shank 94. Trailing edge 98 defines a downstream edge of rotor blade 92 (with a downstream direction to the right as shown in FIG. 2). Trailing edge 98 is disposed on an end of rotor blade 92 that is opposite from leading edge 96 along axial direction A.

Rotor blade 92 further defines an internal passage 100 passing through a portion of shank 94. Internal passage 100 is configured to transport a flow of fluid through a portion of shank 94 along axial direction A.

Turbine rotor 88 defines a gap 102 extending between shank 94 of rotor blade 92 and outer portion along axial direction A of disk 90. Gap 102 is fluidly connected to turbine cooling cavity 86 and to a cooling circuit of rotor blade 92.

FIG. 2 also shows a series of air flows passing through various portions of propulsion system 10. In certain exemplary embodiments, compressed air flow 104 may include a flow of compressed air from, e.g., a compressor discharge cavity (a cavity between the compressor section (e.g., LP compressor 24 and HP compressor 26) and a combustor of combustion section 28). During operation, compressed air flow 104 passes through portions of propulsion system 10 and of HP turbine 30. For example, compressed air flow 104 travels through forward wheelspace cavity 84 to rotor blade 92. As compressed air flow 104 approaches rotor blade 92, a portion of compressed air flow 104 continues along radial direction R up to leading edge 96. Such portion of compressed air flow 104 may prevent or minimize combustion gases 66 from flowing inward of the working gas flowpath of propulsion system 10 between the turbine rotor 88 and the inlet guide vane 70. Another portion of compressed air flow 104 flows along axial direction A and into internal passage 100 of shank 94 to purge aft cavities in a similar manner.

The series of air flows also includes a cooled cooling air flow 106. In an exemplary embodiment, cooled cooling air flow 106 is a flow of air from a heat exchanger of propulsion system 10. More specifically, in at least certain exemplary aspects, the heat exchanger of propulsion system 10 can include a cooled cooling air heat exchanger 107. In an exemplary embodiment, turbofan engine 12 further includes a cooled cooling air heat exchanger 107 as a source of the first flow of air (e.g., cooled cooling air flow 106). During operation of propulsion system 10, cooled cooling air flow 106 from cooled cooling air heat exchanger 107 passes into and through inducer 72 to turbine cooling cavity 86. From turbine cooling cavity 86, cooled cooling air flow 106 flows towards and into gap 102. From gap 102, cooled cooling air flow 106 splits into a tip flow 108, a leading edge flow 110 ("LE flow 110"), and a trailing edge flow 112 ("TE flow 112").

Tip flow 108 is a portion of cooled cooling air flow 106 that is diverted through interior passages (omitted from FIG. 2 for clarity) inside of rotor blade 92 and is delivered to a tip 97 of rotor blade 92. During operation of propulsion system 10, LE flow 110 is directed to leading edge 96 in order to cool leading edge 96.

As TE flow 112 flows outward along radial direction R through shank 94, compressed air flow 104 from internal passage 100 combines with TE flow 112 to form mixed flow 116. In this way, air (e.g., compressed air flow 104) from forward wheelspace cavity 84 acts as coolant for trailing edge 98. For example, compressed air flow 104 may be at a suitable temperature for cooling of rotor blade 92 and the utilization of compressed air flow 104 to cool trailing edge 98 reduces excess purge flow (e.g., purge air 114).

Notably, although internal passage 100 is shown as both providing a portion of the compressed air flow 104 to combine with TE flow 112 to provide cooling to the trailing edge 98, in alternative embodiments, the shank 94 may define a plurality of internal passages fluidly coupled to forward wheelspace cavity 84, with certain of these internal passages 100 only providing bleed air flow cavities aft of the turbine rotor 88, e.g., for purge, and other of these internal passages 100 only providing compressed air flow 104 to an internal cooling circuit of the turbine rotor 88.

Here, a benefit of propulsion system 10 using compressed air flow 104 (from forward wheelspace cavity 84) mixed with TE flow 112 to cool trailing edge 98 is that the use of TE flow 112 is offset or partially offset. This offset or reduction in use of TE flow 112 results in a reduction in the use of cooled cooling air flow 106 and improves specific fuel consumption of propulsion system 10 because the net amount of air taken from the compressor section to cool rotor blade 92 has been reduced.

Figure 3:
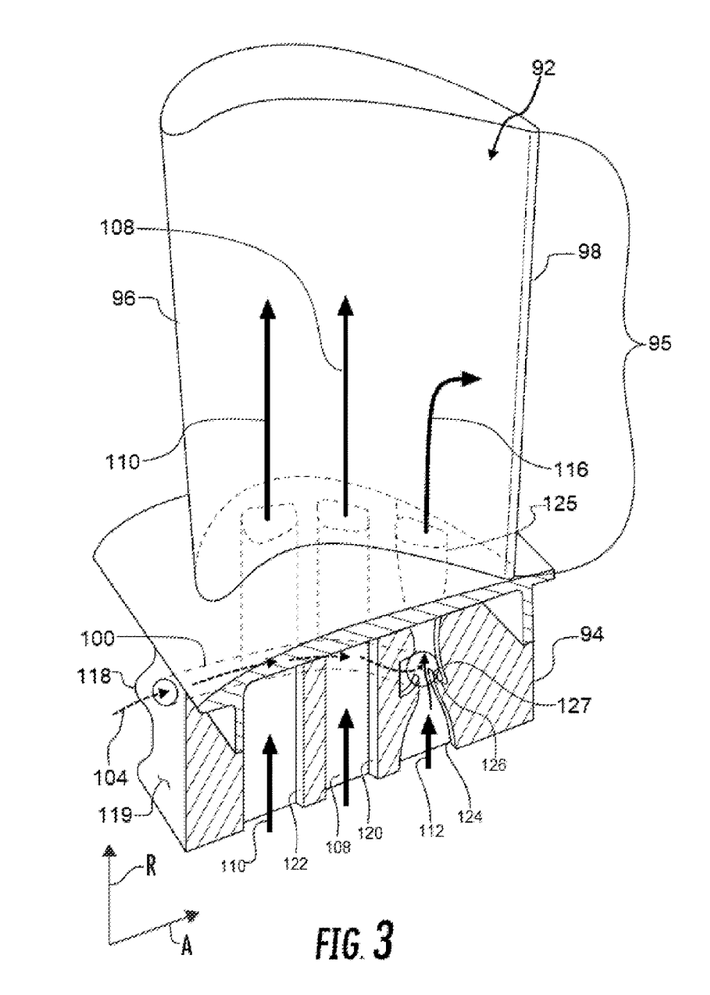
FIG. 3 is a simplified isolated view of a portion of turbine blade and shows cooling passages through the blade in accordance with an exemplary aspect of the present disclosure.

Referring now to FIG. 3, FIG. 3 is a simplified isolated view of rotor blade 92 in accordance with an exemplary aspect of the present disclosure. The embodiment provided in FIG. 3 is configured substantially similarly as described in regard to FIG. 2. As such, FIG. 3 includes the same or similar components as described above with respect to FIG. 2.

In addition to the elements discussed above with respect to FIG. 2, rotor blade 92 additionally includes a tang 118. Tang 118 is a curved protrusion of solid material extending in a direction transverse to axial direction A and a direction that is orthogonal to both axial direction A and to radial direction R. Tang 118 bulges outward from a center of rotor blade 92. Shank 94 defines tang 118. In this particular exemplary embodiment, one tang 118 is shown in view of the cross-section cut of rotor blade 92. It will be appreciated, however, that in other exemplary embodiments, that rotor blade 92 may include two or more tangs 118 along various portions of shank 94.

In certain exemplary embodiments, tang 118 may be used to engaged with a correspondingly shaped slot of disk 90 so as to mechanically attach rotor blade 92 to disk 90. In certain exemplary embodiments, tang 118 defines an inlet (e.g., openings 128A and 128B) of a second cooling circuit (e.g., internal passage 100) that is disposed at an end-face 119 of shank 94.

Also in FIG. 3, rotor blade 92 is shown as including a cooling circuit with a tip channel 120, a leading edge channel 122 ("LE channel 122"), and a trailing edge channel 124 ("TE channel 124"). In certain exemplary embodiments, tip channel 120, LE channel 122, and TE channel 124 may be referred to together as a first cooling circuit. Tip channel 120, LE channel 122, and TE channel 124 are each internal cooling circuits configured to transport a fluid or fluids separately therethrough. In this exemplary embodiment, tip channel 120, LE channel 122, and TE channel 124 are each in fluid communication with gap 102 (see, e.g., FIG. 2). In this way, each of tip channel 120, LE channel 122, and TE channel 124 are in fluid communication with turbine cooling cavity 86 to receive a portion of cooled cooling air flow 106.

During operation of propulsion system 10, tip channel 120 provides tip flow 108 to tip 97 of rotor blade 92, LE channel 122 provides LE flow 110 to leading edge 96, and TE channel 124 provides TE flow 112 to trailing edge 98. In certain exemplary embodiments, turbine rotor 88 includes rotor blade 92 and defines at least in part forward wheelspace cavity 84, the first cooling circuit (e.g., tip channel 120, LE channel 122, and TE channel 124), and the second cooling circuit (e.g., internal passage 100). The first cooling circuit (e.g., tip channel 120, LE channel 122, and TE channel 124) is internal to rotor blade 92 and is configured to be in fluid communication with the primary cooling circuit (e.g., inducer 72 and turbine cooling cavity 86) for receiving the first flow of air (e.g., cooled cooling air flow 106) from the primary cooling circuit (e.g., inducer 72 and turbine cooling cavity 86) when installed in turbofan engine 12 and during operation of turbofan engine 12. The second cooling circuit (e.g., internal passage 100) is internal to rotor blade 92 and is configured to be in fluid communication with forward wheelspace cavity 84 for receiving a portion of the second flow of air (e.g., compressed air flow 104) from forward wheelspace cavity 84 when installed in turbofan engine 12 and during operation of turbofan engine 12.

In certain exemplary embodiments, rotor blade 92 further defines a means for drawing a portion of the second flow of air (e.g., compressed air flow 104) into the second cooling circuit (e.g., internal passage 100). More specifically, in at least certain exemplary aspects, the means for drawing the portion of the second flow of air (e.g., compressed air flow 104) into the second cooling circuit (e.g., internal passage 100) includes a nozzle 127 defined by a jet pump 126 (e.g., an eductor).

In the exemplary embodiment depicted, propulsion system 10 further includes a means for drawing a portion of the second flow of air into the second cooling circuit, or more particularly for the embodiment depicted, propulsion system 10 further includes a means for drawing a portion of the bleed air flow into the internal passage 100. More specifically, still, for the embodiment depicted, the means for drawing a portion of the bleed air flow into the internal passage 100 includes jet pump 126. Jet pump 126 is a type of pump with no moving parts that is configured to deliver a first high pressure fluid to draw a second lower pressure fluid into a combined stream of both the first and second fluids. In an exemplary embodiment, jet pump 126 may include an eductor. In such an exemplary embodiment, the means for drawing a portion of the bleed air flow into the internal passage 100 includes eductor in fluid communication with a trailing edge cooling circuit 125 and with the second cooling circuit (e.g., internal passage 100). It will be appreciated, however, that in other exemplary embodiments, jet pump 126 may include an ejector, an injector, or other types of jet pumps. Jet pump 126 is in fluid communication with internal passage 100 and with TE channel 124.

Rotor blade 92 includes trailing edge 98 and further defines trailing edge cooling circuit 125 that is configured to deliver air to trailing edge 98 of rotor blade 92. In certain exemplary embodiments, the first cooling circuit (e.g., tip channel 120, LE channel 122, and TE channel 124) includes trailing edge cooling circuit 125 that is configured to deliver air to trailing edge 98 of rotor blade 92.

Referring back to jet pump 126, in at least certain exemplary aspects, the means for drawing the portion of the second flow of air (e.g., compressed air flow 104) into the second cooling circuit (e.g., internal passage 100) includes jet pump 126 (e.g., an eductor) that is in fluid communication with trailing edge cooling circuit 125 and with the second cooling circuit (e.g., internal passage 100).

For example, as TE flow 112 passes through a constricted part or nozzle 127 of jet pump 126, TE flow 112 is accelerated into trailing edge cooling circuit 125 (e.g., portion of TE channel 124 downstream from jet pump 126, with a downstream direction oriented in an upward direction from jet pump 126 as shown in FIG. 3). As a result, a static pressure at nozzle 127 of jet pump 126 is lowered in response to accelerating TE flow 112 into the trailing edge cooling circuit 125. In response to the lowered static pressure at nozzle 127 of jet pump 126, compressed air flow 104 is drawn into the trailing edge circuit (e.g., into TE channel 124) at jet pump 126. In this way, as compressed air flow 104 is drawn into trailing edge cooling circuit, compressed air flow 104 mixes with TE flow 112 to form mixed flow 116. In the exemplary embodiment depicted, the means for drawing a portion of the bleed air flow into the internal passage 100 includes nozzle 127 defined by jet pump 126 (e.g., the eductor).

As shown in FIG. 3, jet pump 126 may be integrated into shank 94 of rotor blade 92 such that TE flow 112 (e.g., fresh coolant) exits nozzle 127 of jet pump 126 and transfers momentum to compressed air flow 104 (e.g., the incoming forward cavity air), thus drawing in more compressed air flow 104 into TE channel 124.

Figure 4:
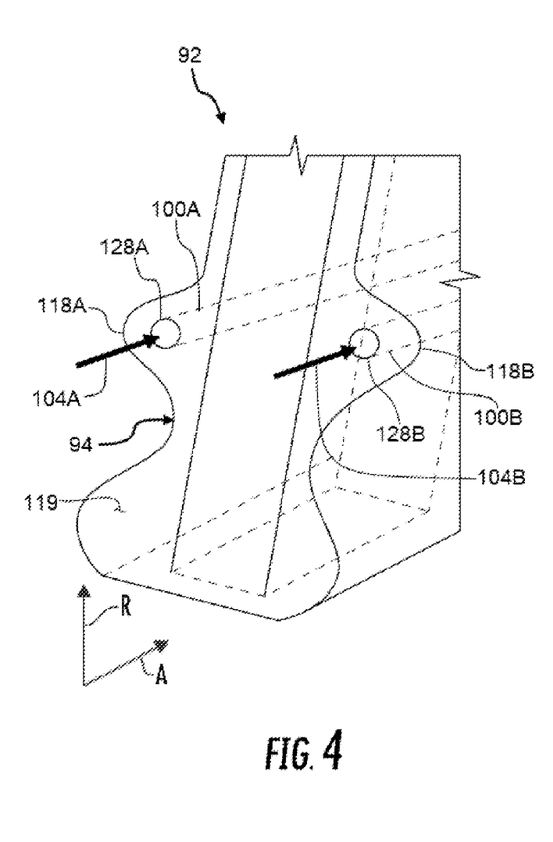
FIG. 4 is a zoomed-in isolated view of a root of a turbine blade and shows an alignment of cooling passages through the root in accordance with an exemplary aspect of the present disclosure.

Referring now to FIG. 4, FIG. 4 is a zoomed-in isolation view of shank 94 in accordance with an exemplary aspect of the present disclosure.

Shank 94 defines an internal passage 100A and an internal passage 100B. In certain exemplary embodiments, shank 94 defines tangs 118A and 118B that bulge outward from a center of rotor blade 92. Tangs 118A and 118B defines an inlet (e.g., openings 128A and 128B) of the second cooling circuit (e.g., internal passage 100) that is disposed at an end-face 119 of shank 94.

In certain exemplary embodiments, internal passage 100A can be disposed in a portion of tang 118A and internal passage 100B can be disposed in a portion of another tang 118B. In such an example, with having internal passage 100A and internal passage 100B positioned in tang 118A and tang 118B, respectively, and towards the edges of shank 94, internal passage 100A and internal passage 100B are spaced apart from tip channel 120 and LE channel 122 (omitted from FIG. 4 for clarity, which occupy a center of rotor blade 92). In this way, compressed air flow 104A and compressed air flow 104B can bypass and avoid tip channel 120 and LE channel 122 as internal passage 100A and internal passage 100B deliver compressed air flow 104A and compressed air flow 104B to TE channel 124 at jet pump 126 (see, e.g., FIG. 3). For example, internal passage 100A and internal passage 100B can converge at TE channel 124 at jet pump 126 so as to have both internal passage 100A and internal passage 100B deliver compressed air flow 104A and compressed air flow 104B to TE channel 124 at a single location (e.g., at jet pump 126).

An opening 128A and an opening 128B can further be defined by shank 94 of rotor blade 92. Opening 128A and opening 128B are holes or inlets disposed in and defined by shank 94 of rotor blade 92 along an end-face 119 of shank 94. Opening 128A is in fluid communication with internal passage 100A and opening 128B is in fluid communication with internal passage 100B.

In this way, compressed air flow 104A and compressed air flow 104B is prevented from communicating or mixing with tip flow 108 and LE flow 110 thereby preserving the thermal and pressure characteristics of the respective air flows.

It will be appreciated, however, that in other embodiments, propulsion system 10 may further include any additional or alternative means for drawing a portion of the second flow of air into the second cooling circuit, or more particularly into internal passage 100. For example, in certain exemplary embodiments, the means for drawing the portion of the second flow of air into internal passage 100 may include an inlet airflow feature. The inlet airflow feature may be any feature at an inlet to internal passage configured to increase an amount of airflow into internal passage 100.

Figure 5:
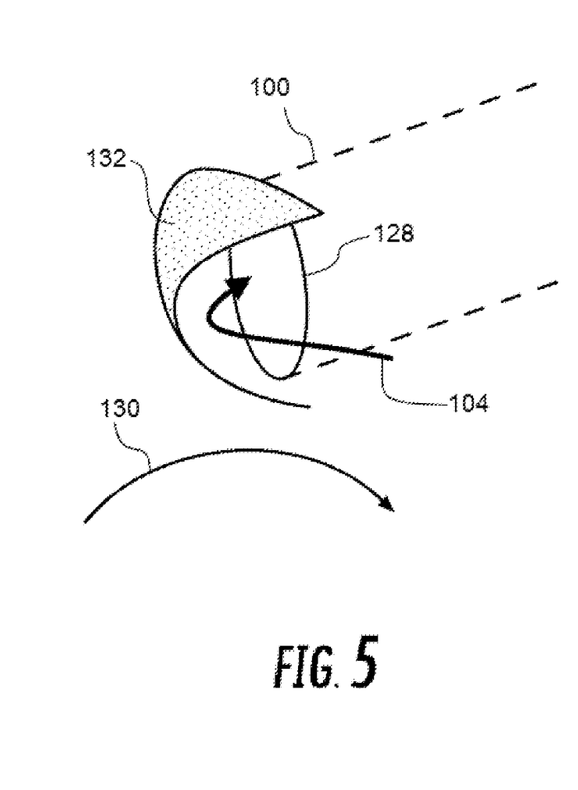
FIG. 5 is an isolated view of a bleed hole with a curved scoop in accordance with an exemplary aspect of the present disclosure.

For example, referring now to FIG. 5, FIG. 5 is an isolated view of internal passage 100 and shows a first exemplary embodiment of an inlet airflow feature. For the embodiment shown, the inlet airflow feature is a curved scoop at opening 128 in accordance with an exemplary aspect of the present disclosure.

As depicted in FIG. 5, a direction of rotation 130 represents a direction of rotation of rotor blade 92 (via rotation of disk 90 about longitudinal centerline 14, see, e.g., FIGS. 1-4). During operation of propulsion system 10, as rotor blade 92 is rotating at some velocity, compressed air flow 104 (e.g., within forward wheelspace cavity 84, see, e.g., FIG. 2) moves relative to rotor blade 92 across opening 128 of internal passage 100.

In certain exemplary embodiments, the inlet airflow feature is more specifically a scoop 132 located at opening 128 of internal passage 100. Put another way, rotor blade 92 includes scoop 132 located at an inlet (e.g., opening 128) of the second cooling circuit (e.g., internal passage 100). More specifically, in at least certain exemplary aspects, scoop 132 can include a hooded scoop or a curved surface such as a spherical wedge (e.g., with a dihedral angle of the spherical wedge being equal to or less than $\pi/2$ radians, such as equal to or less than $\pi/4$ radians, such as equal to or less than $\pi/8$ radians, such as greater than 0 radians) or an ellipsoid wedge. In at least certain exemplary aspects, scoop 132 protrudes outward and away from a body of shank 94 of rotor blade 92 (see, e.g., FIGS. 2-4).

Scoop 132 is shaped so as to protrude out from shank 94 and into a portion of forward wheelspace cavity 84. With scoop 132 protruding into a portion of forward wheelspace cavity 84, as rotor blade 92 is rotating relative to forward wheel space cavity 84, compressed air flow 104 is passing by rotor blade 92 with an amount of velocity. As compressed air flow 104 comes into contact with scoop 132, scoop 132 captures some dynamic head of compressed air flow 104 and redirects a portion of compressed air flow 104 into opening 128. As the portion of compressed air flow 104 is redirected by scoop 132 into opening 128, the portion of compressed air flow 104 is drawn into by scoop 132 and through internal passage 100.

In this way, an effective pressure of compressed air flow 104 delivered to the trailing edge cooling circuit 125 is increased resulting in a greater amount of compressed air flow 104 delivered to TE channel 124. With more compressed air flow 104 being used to cool trailing edge 98, a lower amount of TE flow 112, and thus a lower amount of cooled cooling air flow 106, is required to cool trailing edge 98. As a result, the overall cost of cooling rotor blade 92 is decreased thereby improving the specific fuel consumption of propulsion system 10.

Figure 6:
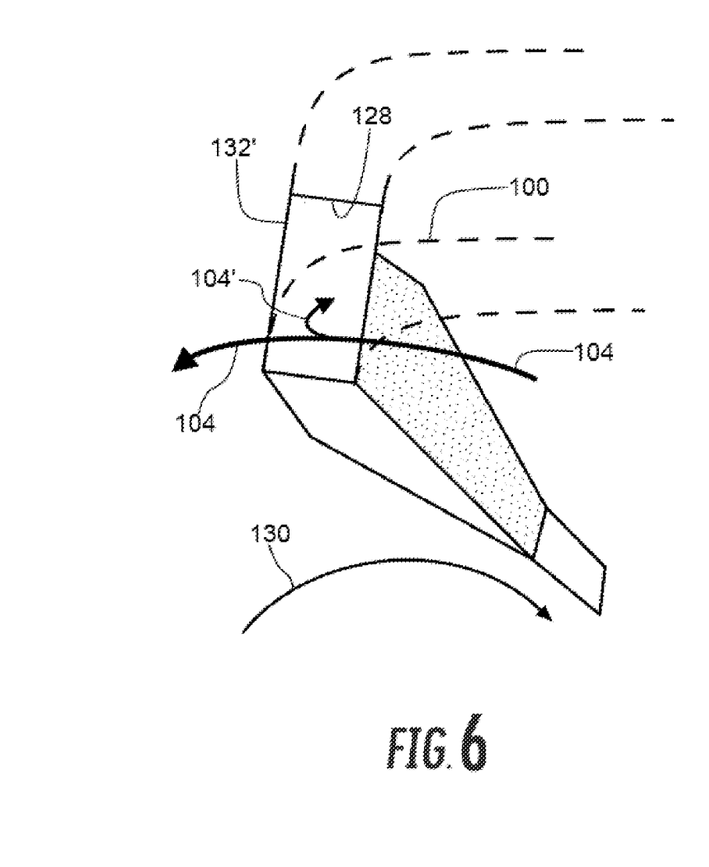
FIG. 6 is a is an isolated view of a bleed hole with a recessed opening in accordance with an exemplary aspect of the present disclosure.

Referring now to FIG. 6, FIG. 6 is an isolated view of internal passage 100 and shows a second exemplary embodiment of an inlet airflow feature. For the embodiment shown, the inlet airflow feature is a recessed opening at opening 128 of internal passage 100.

As shown in FIG. 6, opening 128 defines a scoop 132'. In certain exemplary embodiments, scoop 132' defines a recessed opening (e.g., opening 128) and includes a recessed scoop, or a scoop that is recessed into a portion of shank 94. Scoop 132' incorporates a low-drag air inlet design configured to draw in a portion 104' of compressed air flow 104 with a low level of disturbance to compressed air flow 104 flowing across opening 128.

Scoop 132' is configured to draw a portion of the second flow of air (e.g., compressed air flow 104) into the second cooling circuit (e.g., internal passage 100) with the recessed opening (e.g., opening 128) of scoop 132'. For example, during operation, as rotor blade 92 moves along direction of rotation 130, compressed air flow 104 moves across opening 128. As compressed air flow 104 passes across opening 128, portion 104' of compressed air flow 104 is drawn into internal passage 100 via scoop 132' at opening 128. As a result, portion 104' of compressed air flow 104 entering into internal passage 100 has the effect of increasing a total pressure of mixed flow 116 utilized by the trailing edge cooling circuit 125 to cool trailing edge 98 of rotor blade 92.

It will be appreciated, however, that in other exemplary embodiments, the turbine rotor 88, or shank 94 of the turbine rotor 88, may define or include any other suitable airflow feature as the means for drawing a portion of the second flow of air into the second cooling circuit, or more particularly into the internal passage 100. For example, the airflow feature may be any other geometry of scoop (e.g., protruding from the shank 94), indentation (e.g., extending into the shank 94), or a combination thereof. Additionally, in certain exemplary embodiments the airflow feature may be used in combination with other means for drawing a portion of the second flow of air into the second cooling circuit, or may be used as the sole means for drawing a portion of the second flow of air into the second cooling circuit, or more particularly into the internal passage 100.

Figure 7:
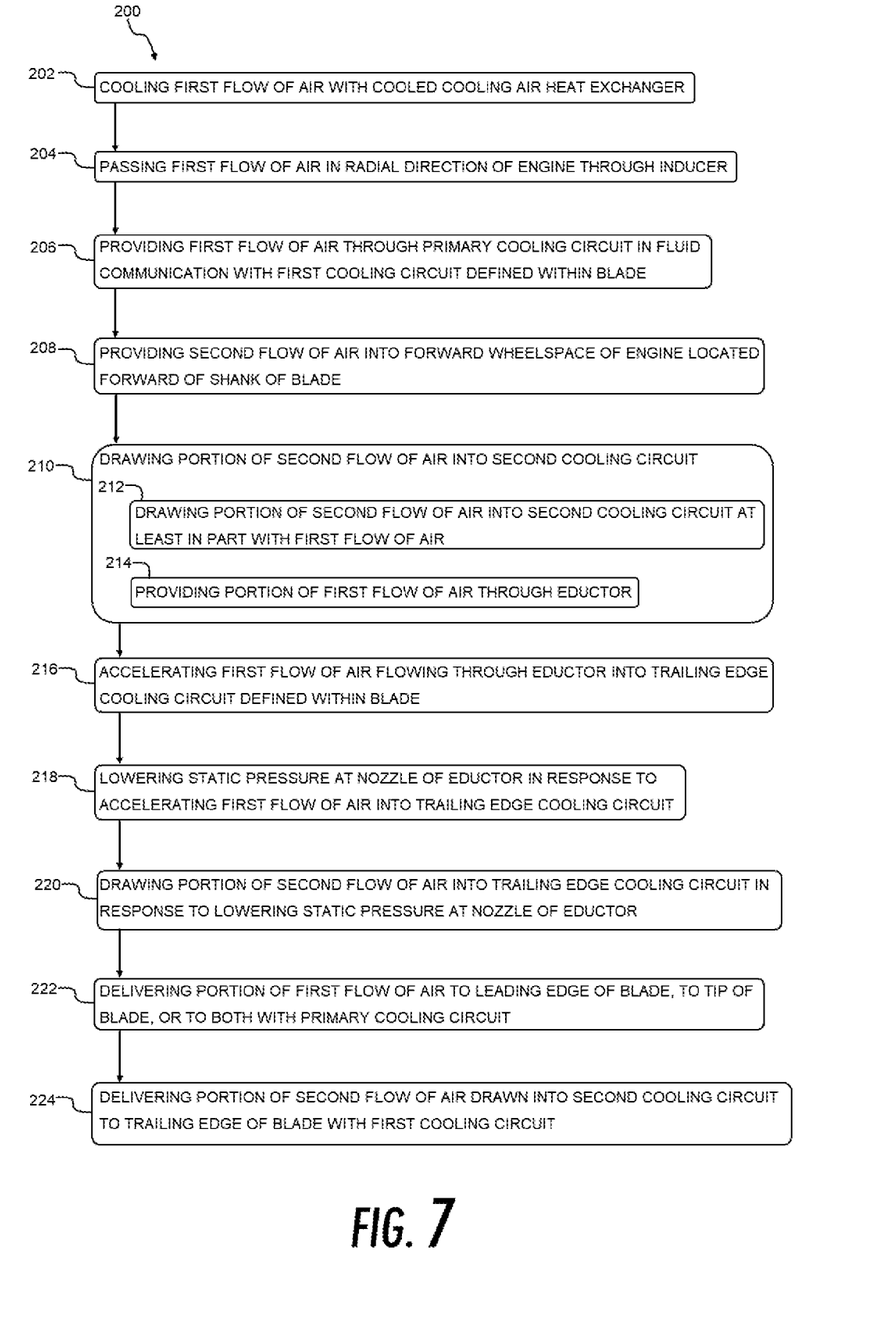
FIG. 7 is a is a flowchart of a method of cooling a blade of an engine in accordance with an exemplary aspect of the present disclosure.

Referring now to FIG. 7, a method 200 of cooling a blade of an engine in accordance with an exemplary aspect of the present disclosure is provided. The method may be used in conjunction with one or more of the exemplary embodiments described above, or may be used with any other suitable structure.

Method 200 includes at 202 cooling the first flow of air (e.g., cooled cooling air flow 106) with cooled cooling air heat exchanger 107 before providing the first flow of air (e.g., cooled cooling air flow 106) to the primary cooling circuit (e.g., inducer 72 and turbine cooling cavity 86). Method 200 includes at 204 passing the first flow of air (e.g., cooled cooling air flow 106) in radial direction R of turbofan engine 12 through inducer 72 before providing the first flow of air (e.g., cooled cooling air flow 106) to the primary cooling circuit (e.g., inducer 72 and turbine cooling cavity 86). Method 200 includes at 206 providing the first flow of air (e.g., cooled cooling air flow 106) through the primary cooling circuit (e.g., inducer 72 and turbine cooling cavity 86) in fluid communication with the first cooling circuit (e.g., tip channel 120, LE channel 122, and TE channel 124) defined within the blade (e.g., turbine rotor blade 92). Method 200 includes at 208 providing the second flow of air (e.g., compressed air flow 104) into forward wheelspace cavity 84 of turbofan engine 12 located forward of shank 94 of the blade (e.g., turbine rotor blade 92) and that is in fluid communication with the second cooling circuit (e.g., internal passage 100) defined within the blade (e.g., turbine rotor blade 92).

Method 200 includes at 210 drawing a portion of the second flow of air (e.g., compressed air flow 104) into the second cooling circuit (e.g., internal passage 100). In certain exemplary embodiments, step 210 of method 200 may include at step 212 drawing the portion of the second flow of air (e.g., compressed air flow 104) into the second cooling circuit (e.g., internal passage 100) at least in part with the first flow of air (e.g., cooled cooling air flow 106). In certain exemplary embodiments, step 210 of method 200 may also include at step 214 providing a portion of the first flow of air (e.g., cooled cooling air flow 106) through the eductor (e.g., jet pump 126) defined by the blade (e.g., turbine rotor blade 92).

Method 200 includes at 216 accelerating, with the eductor (e.g., jet pump 126), the first flow of air (e.g., cooled cooling air flow 106) flowing through the eductor (e.g., jet pump 126) into the trailing edge cooling circuit 125 defined within the blade (e.g., turbine rotor blade 92). Method 200 includes at 218 lowering a static pressure at nozzle 127 of the eductor (e.g., jet pump 126) in response to accelerating the first flow of air (e.g., cooled cooling air flow 106) into the trailing edge cooling circuit 125. Method 200 includes at 220 drawing the portion of the second flow of air (e.g., compressed air flow 104) into the trailing edge cooling circuit 125 in response to lowering the static pressure at nozzle 127 of the eductor (e.g., jet pump 126).

Method 200 includes at 222 delivering, with the primary cooling circuit (e.g., inducer 72 and turbine cooling cavity 86), a portion of the first flow of air (e.g., cooled cooling air flow 106) to leading edge 96 of the blade (e.g., turbine rotor blade 92), to tip 97 of the blade (e.g., turbine rotor blade 92), or to both. Method 200 includes at 224 delivering, with the first cooling circuit (e.g., tip channel 120, LE channel 122, and TE channel 124), the portion of the second flow of air (e.g., compressed air flow 104) drawn into the second cooling circuit (e.g., internal passage 100) to trailing edge 98 of the blade (e.g., turbine rotor blade 92).

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining an axial direction and a radial direction, the gas turbine engine comprising: a primary cooling circuit configured to receive a first flow of air; and a turbine rotor comprising a rotor blade, the rotor blade defining at least in part a forward wheelspace that is located forward of the rotor blade, the forward wheelspace configured to receive a second flow of air, the rotor blade further defining: a first cooling circuit internal to the rotor blade and in fluid communication with the primary cooling circuit for receiving the first flow of air from the primary cooling circuit; a second cooling circuit internal to the rotor blade and in fluid communication with the forward wheelspace for receiving a portion of the second flow of air from the forward wheelspace; and a means for drawing a portion of the second flow of air into the second cooling circuit.

The gas turbine engine of one or more of these clauses, wherein the rotor blade comprises a trailing edge, wherein the first cooling circuit includes a trailing edge cooling circuit configured to deliver air to the trailing edge of the rotor blade.

The gas turbine engine of one or more of these clauses, wherein the first cooling circuit includes a trailing edge cooling circuit, wherein the means for drawing the portion of the second flow of air into the second cooling circuit comprises an eductor in fluid communication with the trailing edge cooling circuit, with the first cooling circuit, and with the second cooling circuit.

The gas turbine engine of one or more of these clauses, wherein the means for drawing the portion of the second flow of air into the second cooling circuit comprises a nozzle defined by the eductor.

The gas turbine engine of one or more of these clauses, wherein the rotor blade further comprises: a shank defined by an inward portion along the radial direction of the rotor blade; a leading edge disposed outward along the radial direction from the shank; and a trailing edge disposed on an end of the rotor blade that is opposite from the leading edge along the axial direction, wherein the first cooling circuit comprises a trailing edge cooling circuit configured to deliver air to the trailing edge of the rotor blade.

The gas turbine engine of one or more of these clauses, wherein the rotor blade further comprises: a shank defined by an inward portion along the radial direction of the rotor blade; a leading edge disposed outward along the radial direction from the shank; and a trailing edge disposed on an end of the rotor blade that is opposite from the leading edge along the axial direction, wherein the shank defines a tang that bulges outward from a center of the rotor blade, wherein the tang defines an inlet of the second cooling circuit, wherein the inlet is disposed at an end-face of the shank.

The gas turbine engine of one or more of these clauses, wherein the gas turbine engine defines an inducer, wherein the inducer is connected to and is disposed upstream from the primary cooling circuit, wherein the inducer is in fluid communication with the primary cooling circuit.

The gas turbine engine of one or more of these clauses, further comprising a source of the first flow of air, wherein the source of the first flow of air comprises a cooled cooling air heat exchanger.

The gas turbine engine of one or more of these clauses, wherein the primary cooling circuit is configured to rotate about a longitudinal centerline of the gas turbine engine.

The gas turbine engine of one or more of these clauses, wherein the rotor blade further comprises: a shank defined by an inward portion along the radial direction of the rotor blade; a leading edge disposed outward along the radial direction from the shank; a trailing edge disposed on an end of the rotor blade that is opposite from the leading edge along the axial direction; and wherein the means for drawing the portion of the second flow of air into the second cooling circuit comprises a scoop located at an inlet of the second cooling circuit, wherein the scoop protrudes outward and away from the shank of the rotor blade.

The gas turbine engine of one or more of these clauses, wherein the means for drawing the portion of the second flow of air into the second cooling circuit comprises a scoop located at an inlet of the second cooling circuit, wherein the scoop defines a recessed opening, wherein the scoop is configured to draw a portion of the second flow of air into the second cooling circuit with the recessed opening of the scoop.

A rotor blade for a turbine of a gas turbine engine, the gas turbine engine defining a primary cooling circuit configured to receive a first flow of air and defining a forward wheelspace configured to receive a second flow of air, the rotor blade defining: a first cooling circuit internal to the rotor blade and configured to be in fluid communication with the primary cooling circuit for receiving the first flow of air from the primary cooling circuit when installed in the gas turbine engine and during operation of the gas turbine engine; a second cooling circuit internal to the rotor blade and configured to be in fluid communication with a forward wheelspace of the gas turbine engine for receiving a portion of a second flow of air from the forward wheelspace when installed in the gas turbine engine and during operation of the gas turbine engine; and a means for drawing a portion of the second flow of air into the second cooling circuit.

A method of cooling a blade of an engine, the engine defining an axial direction and a radial direction, the blade including a shank, the method comprising: providing a first flow of air through a primary cooling circuit, the primary cooling circuit in fluid communication with a first cooling circuit defined within the blade; providing a second flow of air into a forward wheelspace of the engine that is located forward of the shank along the axial direction, the forward wheelspace in fluid communication with a second cooling circuit defined within the blade; and drawing a portion of the second flow of air into the second cooling circuit.

The method of one or more of these clauses, wherein drawing the portion of the second flow of air into the second cooling circuit comprises drawing the portion of the second flow of air into the second cooling circuit at least in part with the first flow of air.

The method of one or more of these clauses, wherein the blade defines an eductor, wherein drawing the portion of the second flow of air into the second cooling circuit at least in part with the first flow of air comprises providing a portion of the first flow of air through the eductor.

The method of one or more of these clauses, further comprising: accelerating, with the eductor, the first flow of air flowing through the eductor into a trailing edge cooling circuit defined within the blade; lowering a static pressure at a nozzle of the eductor in response to accelerating the first flow of air into the trailing edge cooling circuit; and drawing the portion of the second flow of air into the trailing edge cooling circuit in response to lowering the static pressure at the nozzle of the eductor.

The method of one or more of these clauses, further comprising delivering, with the primary cooling circuit, a portion of the first flow of air to any cooling circuit defined within the blade.

The method of one or more of these clauses, further comprising delivering, with the first cooling circuit, the portion of the second flow of air drawn into the second cooling circuit to a trailing edge of the blade.

The method of one or more of these clauses, further comprising cooling the first flow of air with a cooled cooling air heat exchanger before providing the first flow of air through the primary cooling circuit.

The method of one or more of these clauses, further comprising passing the first flow of air through an inducer before providing the first flow of air to the primary cooling circuit.

I claim:

1. A gas turbine engine defining an axial direction and a radial direction, the gas turbine engine comprising:
   a primary cooling circuit configured to receive a first flow of air; and
   a turbine rotor comprising a rotor blade, the rotor blade defining at least in part a forward wheelspace that is located forward of the rotor blade, the forward wheelspace configured to receive a second flow of air, the rotor blade further defining:
   a first cooling circuit internal to the rotor blade and in fluid communication with the primary cooling circuit for receiving the first flow of air from the primary cooling circuit;
   a second cooling circuit internal to the rotor blade and in fluid communication with the forward wheelspace for receiving a portion of the second flow of air from the forward wheelspace; and
   a means for drawing a portion of the second flow of air into the second cooling circuit.

2. The gas turbine engine of claim 1, wherein the rotor blade comprises a trailing edge, wherein the first cooling circuit includes a trailing edge cooling circuit configured to deliver air to the trailing edge of the rotor blade.

3. The gas turbine engine of claim 1, wherein the first cooling circuit includes a trailing edge cooling circuit, wherein the means for drawing the portion of the second flow of air into the second cooling circuit comprises an eductor in fluid communication with the trailing edge cooling circuit, with the first cooling circuit, and with the second cooling circuit.

4. The gas turbine engine of claim 3, wherein the means for drawing the portion of the second flow of air into the second cooling circuit comprises a nozzle defined by the eductor.

5. The gas turbine engine of claim 1, wherein the rotor blade further comprises:
a shank defined by an inward portion along the radial direction of the rotor blade;
a leading edge disposed outward along the radial direction from the shank; and
a trailing edge disposed on an end of the rotor blade that is opposite from the leading edge along the axial direction,
wherein the first cooling circuit comprises a trailing edge cooling circuit configured to deliver air to the trailing edge of the rotor blade.

6. The gas turbine engine of claim 1, wherein the rotor blade further comprises:
a shank defined by an inward portion along the radial direction of the rotor blade;
a leading edge disposed outward along the radial direction from the shank; and
a trailing edge disposed on an end of the rotor blade that is opposite from the leading edge along the axial direction,
wherein the shank defines a tang that bulges outward from a center of the rotor blade, wherein the tang defines an inlet of the second cooling circuit, wherein the inlet is disposed at an end-face of the shank.

7. The gas turbine engine of claim 1, wherein the gas turbine engine defines an inducer, wherein the inducer is connected to and is disposed upstream from the primary cooling circuit, wherein the inducer is in fluid communication with the primary cooling circuit.

8. The gas turbine engine of claim 1, further comprising a source of the first flow of air, wherein the source of the first flow of air comprises a cooled cooling air heat exchanger.

9. The gas turbine engine of claim 1, wherein the primary cooling circuit is configured to rotate about a longitudinal centerline of the gas turbine engine.

10. The gas turbine engine of claim 1, wherein the rotor blade further comprises:
a shank defined by an inward portion along the radial direction of the rotor blade;
a leading edge disposed outward along the radial direction from the shank;
a trailing edge disposed on an end of the rotor blade that is opposite from the leading edge along the axial direction; and
wherein the means for drawing the portion of the second flow of air into the second cooling circuit comprises a scoop located at an inlet of the second cooling circuit, wherein the scoop protrudes outward and away from the shank of the rotor blade.

11. The gas turbine engine of claim 1, wherein the means for drawing the portion of the second flow of air into the second cooling circuit comprises a scoop located at an inlet of the second cooling circuit, wherein the scoop defines a recessed opening, wherein the scoop is configured to draw a portion of the second flow of air into the second cooling circuit with the recessed opening of the scoop.

12. A rotor blade for a turbine of a gas turbine engine, the gas turbine engine defining primary cooling circuit configured to receive a first flow of air and defining a forward wheelspace configured to receive a second flow of air, the rotor blade defining:
a first cooling circuit internal to the rotor blade and configured to be in fluid communication with the primary cooling circuit for receiving the first flow of air from the primary cooling circuit when installed in the gas turbine engine and during operation of the gas turbine engine;
a second cooling circuit internal to the rotor blade and configured to be in fluid communication with a forward wheelspace of the gas turbine engine for receiving a portion of a second flow of air from the forward wheelspace when installed in the gas turbine engine and during operation of the gas turbine engine; and
a means for drawing a portion of the second flow of air into the second cooling circuit.

13. A method of cooling a blade of an engine, the engine defining an axial direction and a radial direction, the blade including a shank, the method comprising:
providing a first flow of air through a primary cooling circuit, the primary cooling circuit in fluid communication with a first cooling circuit defined within the blade;
providing a second flow of air into a forward wheelspace of the engine that is located forward of the shank along the axial direction, the forward wheelspace in fluid communication with a second cooling circuit defined within the blade;
drawing a portion of the second flow of air into the second cooling circuit wherein the blade defines an eductor, wherein drawing the portion of the second flow of air into the second cooling circuit at least in part with the first flow of air comprises providing a portion of the first flow of air through the eductor.

14. The method of claim 13, wherein drawing the portion of the second flow of air into the second cooling circuit comprises drawing the portion of the second flow of air into the second cooling circuit at least in part with the first flow of air.

15. The method of claim 13, further comprising:
accelerating, with the eductor, the first flow of air flowing through the eductor into a trailing edge cooling circuit defined within the blade;
lowering a static pressure at a nozzle of the eductor in response to accelerating the first flow of air into the trailing edge cooling circuit; and
drawing the portion of the second flow of air into the trailing edge cooling circuit in response to lowering the static pressure at the nozzle of the eductor.

16. The method of claim 13, further comprising delivering, with the primary cooling circuit, a portion of the first flow of air to any cooling circuit defined within the blade.

17. The method of claim 13, further comprising delivering, with the first cooling circuit, the portion of the second flow of air drawn into the second cooling circuit to a trailing edge of the blade.

18. The method of claim 13, further comprising cooling the first flow of air with a cooled cooling air heat exchanger before providing the first flow of air through the primary cooling circuit.

19. The method of claim 13, further comprising passing the first flow of air through an inducer before providing the first flow of air to the primary cooling circuit.

* * * * *